US010539267B2

(12) United States Patent
Olsen

(10) Patent No.: US 10,539,267 B2
(45) Date of Patent: Jan. 21, 2020

(54) CLIP AND RELATED METHODS OF USE

(71) Applicant: Fredrick H. Olsen, Murray, UT (US)

(72) Inventor: Fredrick H. Olsen, Murray, UT (US)

( * ) Notice: Subject to any disclaimer, the term of this patent is extended or adjusted under 35 U.S.C. 154(b) by 0 days.

(21) Appl. No.: 16/028,119

(22) Filed: Jul. 5, 2018

(65) Prior Publication Data

US 2019/0011078 A1    Jan. 10, 2019

Related U.S. Application Data

(60) Provisional application No. 62/530,033, filed on Jul. 7, 2017.

(51) Int. Cl.
*F16M 13/02*  (2006.01)
*F21V 21/088* (2006.01)
*F21W 121/00* (2006.01)

(52) U.S. Cl.
CPC ......... *F16M 13/022* (2013.01); *F21V 21/088* (2013.01); *F21W 2121/006* (2013.01)

(58) Field of Classification Search
CPC ............... F16M 13/022; F21V 21/088; F21W 2121/006; F21W 2121/004; F16L 3/24; F21S 4/10
See application file for complete search history.

(56) References Cited

U.S. PATENT DOCUMENTS

| | | | | |
|---|---|---|---|---|
| 2,657,442 A * | 11/1953 | Bedford, Jr. | ............ | F16B 5/121 248/72 |
| 3,599,916 A * | 8/1971 | Szabo | ...................... | F16L 3/24 24/339 |
| 5,148,981 A * | 9/1992 | Lynch, Jr. | ............... | E01B 9/306 238/14.14 |
| 5,388,802 A | 2/1995 | Dougan et al. | | |
| 5,607,230 A | 3/1997 | Protz, Jr. | | |
| 5,829,103 A * | 11/1998 | Allen | ....................... | A42B 1/24 24/11 R |
| 5,915,848 A * | 6/1999 | Deason | ..................... | E04H 4/14 4/496 |
| 5,921,511 A * | 7/1999 | LaPointe | .................. | F21V 21/08 248/58 |
| 6,477,744 B1 * | 11/2002 | Miles | .................... | B43K 23/002 24/3.1 |
| 7,249,866 B1 * | 7/2007 | Tai | ........................ | F21V 21/008 362/147 |
| 7,926,777 B2 * | 4/2011 | Koesema, Jr. | ............ | F16L 3/13 24/336 |
| 8,545,041 B2 * | 10/2013 | Brown | ..................... | A42B 1/24 24/336 |
| 8,888,337 B2 * | 11/2014 | Adams, IV | ........... | F21V 21/088 362/287 |
| 2003/0076678 A1 * | 4/2003 | Diaco | .................. | F21V 21/088 362/249.03 |
| 2010/0115739 A1 * | 5/2010 | Mathur | ..................... | A45F 5/02 24/306 |
| 2015/0276093 A1 * | 10/2015 | Aotani | ...................... | F16L 3/24 248/72 |
| 2018/0017240 A1 * | 1/2018 | Schreiber | ............ | F21V 21/088 |

\* cited by examiner

*Primary Examiner* — Anita M King
(74) *Attorney, Agent, or Firm* — Stoel Rives LLP; Jordan B. Olsen

(57) ABSTRACT

The embodiments disclosed herein relate to a clip. The clip can include a base, a first arm, a second arm, and a third arm. The first arm and the second arm can be used to couple the clip to a structure. The clip can also include at least one channel for retaining an object.

19 Claims, 4 Drawing Sheets

CLIP AND RELATED METHODS OF USE

RELATED APPLICATIONS

This application claims priority to U.S. Provisional Application No. 62/530,033, filed on Jul. 7, 2017 and titled "CLIP AND RELATED METHODS OF USE," which is incorporated herein by reference in its entirety.

TECHNICAL FIELD

The present disclosure relates generally to a clip. More specifically, the present disclosure relates to a clip configured to attach one or more objects to a structure.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
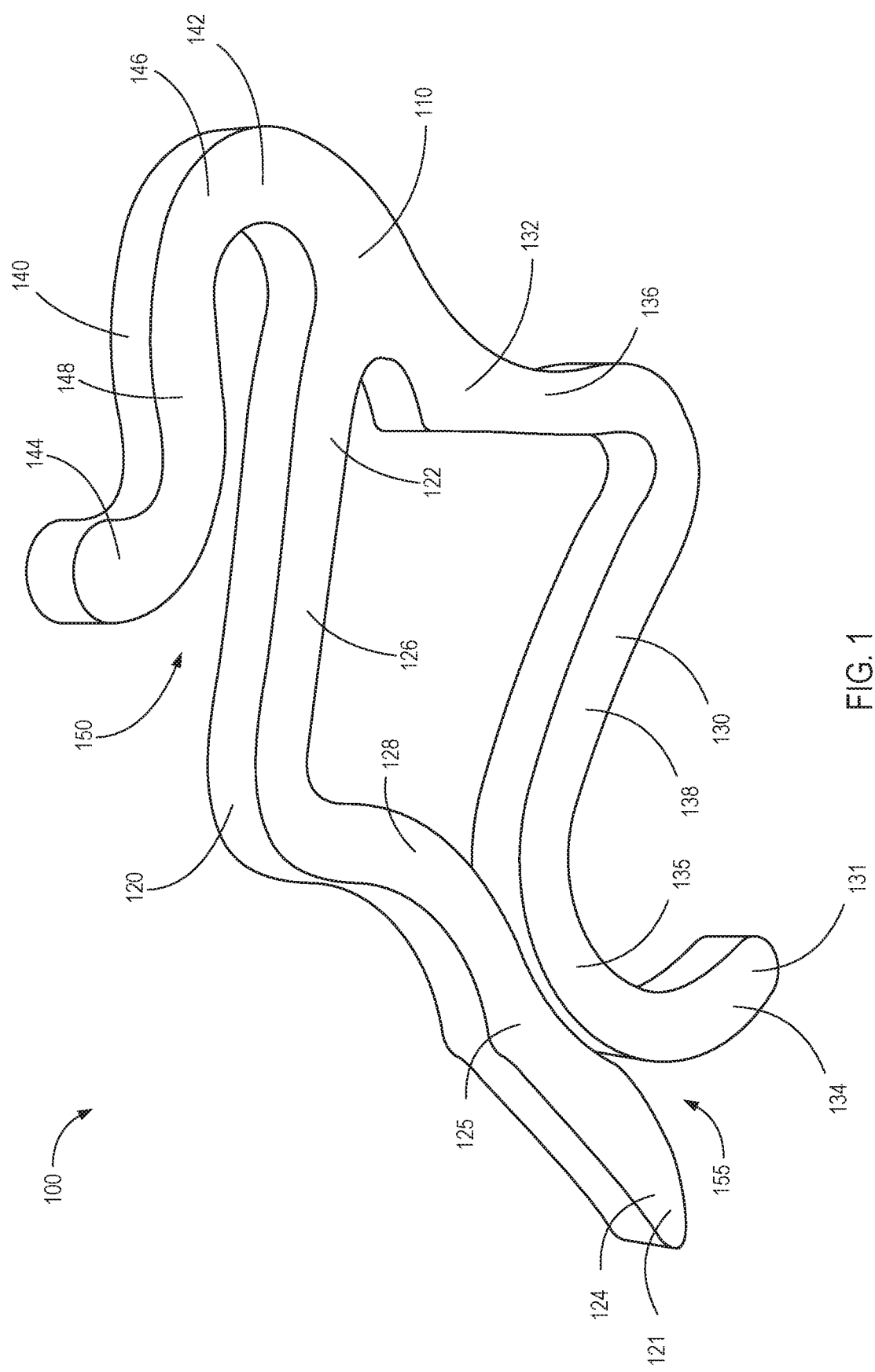
FIG. 1 is a perspective view of a clip in accordance with one embodiment of the present disclosure.

The various embodiments disclosed herein generally relate to a clip. More specifically, the present disclosure relates to a clip configured to attach one or more objects to a structure. In some embodiments, the clip is used for coupling holiday lights to a house. For example, the clip can comprise a base, a first arm, a second arm, a third arm, and a first channel. The first arm and second arm can be configured to cooperate with one another to couple the clip to a house (e.g., such as to a portion of a fascia). And the first channel can be configured for receiving and retaining an electrical cord of a strand (or string) of holiday lights. These and other embodiments are further detailed below.

As set forth below, it will be appreciated that the various features disclosed herein are sometimes grouped together in a single embodiment, figure, or description thereof for the purpose of streamlining the disclosure. Many of these features may be used alone and/or in combination with one another. It will further be appreciated that many of the features disclosed herein may be used in conjunction with other clip systems presently known or hereafter developed.

As used herein, the phrases "connected to" and "coupled to" refer to any form of interaction between two or more entities, including but not limited to mechanical interaction. Two components may be coupled to each other even though they are not in direct contact with each other. For example, two components may be coupled to each other through an intermediate component.

Embodiments may be best understood by reference to the drawings, wherein like parts are designated by like numerals throughout. It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure, but is merely representative of possible embodiments of the disclosure. In some cases, well-known structures, materials, or operations are not shown or described in detail. While the various aspects of the embodiments are presented in drawings, the drawings are not necessarily drawn to scale unless specifically indicated.

FIG. 1 depicts a perspective view of a clip 100 according to one embodiment of the present disclosure. As shown in FIG. 1, the clip 100 comprises a base 110, a first arm 120, a second arm 130, and a third arm 140. The clip 100 further comprises at least one channel 150.

The first arm 120 comprises a first end 122 and a second end 124. The first end 122 is coupled to the base 110, and the second end 124 extends away from the base 110. In certain embodiments, a first portion 126 of the first arm 120 extends along a first direction, and a second portion 128 of the first arm 120 extends along a second direction. In some embodiments, the second end 124 of the first arm 120 comprises a substantially sharp, pointed, sloped, or beveled tip 121. Such a tip 121 can aid in inserting the clip 100 into a gap or channel of a structure (e.g., such as a channel between a soffit and a fascia on a house).

The second arm 130 comprises a first end 132 and a second end 134. The first end 132 is coupled to the base 110, and the second end 134 extends away from the base 110. In certain embodiments, a first portion 136 of the second arm 130 extends along a third direction, and a second portion 138 of the second arm 130 extends along a fourth direction. In some embodiments, the second end 134 of the second arm 130 can be arcuate or substantially hook-shaped. Further, a tip 131 of the second end 134 can extend away from the tip 121 of the first arm 120. Such an end 134 can aid in inserting the clip 100 into a gap or channel of a structure (e.g., such as a channel between a soffit and a fascia on a house). For example, the tip 131 extending away from the tip 121 of the first arm 120 can provide an area of increased width for access into a channel 155.

In some embodiments, the first arm 120 and the second arm 130 can be used to couple the clip 100 on a structure. For example, the first arm 120 and the second arm 130 can be configured to cooperate with one another to couple or otherwise retain the clip 100 on a portion of a structure that is disposed between the first and second arms 120, 130.

In particular embodiments, a portion of the clip 100 (e.g., a portion of the first arm 120) can be configured to be inserted into a gap or channel of a structure, after which the clip 100 can be retained on the structure or otherwise retained in the inserted position. In some of such embodiments, the clip 100 is retained by a force or pressure which is applied to a portion of the structure by the first arm 120 and/or the second arm 130. For example, as shown in FIG. 1, a third portion 125 of the first arm 120 and a third portion 135 of the second arm 130 can be disposed proximate or adjacent to one another. In some embodiments, this position can be referred to as a first configuration or a resting configuration. In certain embodiments, the third portion 125 of the first arm 120 is configured such that it abuts the third portion 135 of the second arm 130. In other embodiments, the third portion 125 of the first arm 120 and the third portion 135 of the second arm 130 define a channel 155.

The first arm 120 and/or the second arm 130 can be biased towards the first configuration. The first arm 120 and/or the second arm 130 can also be resiliently flexible such that the third portion 125 of the first arm 120 and/or the third portion 135 of the second arm 130 can be separated or forced further apart, after which the portions 125, 135 can be biased to move back towards their original positions. For example, one or more forces can be applied to urge the third portion 125 of the first arm 120 away from the third portion 135 of the second arm 130 (and/or vice versa). Upon removal of the one or more forces, the arms 120, 130 can re-assume or substantially re-assume their position in the first configuration.

In particular embodiments, the first arm 120 and/or the second arm 130 can be urged or otherwise forced apart as the clip 100 is coupled to or otherwise disposed onto a structure. For example, the clip 100 can be disposed onto a structure such that a portion of the structure is inserted between the first arm 120 and the second arm 130. For instance, a portion of a structure can be inserted between the third portion 125 of the first arm 120 and the third portion 135 of the second arm 130. If the width of the portion of the structure is greater than the width of the channel 155, the first arm 120 and the second arm 130 will be urged apart, away from their position in the first configuration (or their biased position). Because the first and second arms 120, 130 are biased and resilient, the arms 120, 130 can have a tendency to want to move back towards the first configuration in which the arms 120, 130 were disposed closer to one another. The tendency to want to move back towards the first configuration can result in a force or pressure upon the portion of the structure disposed between the arms 120, 130. In some of such embodiments, the base 110 and/or one or more portions 126, 136, 128, 138 of the arms 120, 130 can act as a biasing member. For example, the shape of the arms 120, 130 can be configured to apply a maximum amount of force onto the portion of the structure disposed between the arms 120, 130. A stress imparted upon the arms 120, 130 (or one or more portions 126, 136, 128, 138 of the arms 120, 130) or upon the base 110 caused by deformation of the clip 100 away from the biased first position can also create a reactionary force that causes the arms 120, 130 to exert pressure upon the portion of the structure disposed between the arms 120, 130.

In some embodiments, the shape of the first arm 120 can also complement the shape of the second arm 130 to aid in coupling the clip 100 to the structure. For example, the shape of the third portion 125 (or a surface thereof) of the first arm 120 can complement the shape of the third portion 135 (or a surface thereof) of the second arm 130. As shown in the illustrated embodiment, for instance, the third portion 125 (or a surface thereof) of the first arm 120 can extend along an arcuate path, and the third portion 135 (or a surface thereof) of the second arm 130 can also extend along a complementary shaped arcuate path. Complementary gripping surfaces can provide increased surface contact between a structure and the clip 100, thereby aiding in coupling the clip 100 to the structure.

The third arm 140 also comprises a first end 142 and a second end 144. The first end 142 is coupled to the base 110, and the second end 144 extends away from the base 110. In certain embodiments a first portion 146 of the third arm 140 extends along a first direction, and a second portion 148 of the third arm 140 extends along a second direction. In certain embodiments, the third arm 140 is substantially S-shaped. In further embodiments, the second end 144 of the third arm 140 can be substantially arcuate. Such an end 144 can provide a wider access or opening into the channel 150, which can also be referred to as a retaining channel 150.

In some embodiments, the third arm 140 is configured to act as a retaining member. For example, the third arm 140 and the first arm 120 can define the channel 150. The channel 150 can be configured to receive an object to be retained by the clip 100. Any variety of objects can be retained within the channel 150 of the clip 100. In certain embodiments, for example, the channel 150 is configured to retain an elongated object, such as a wire, string, rope, and/or electrical cord. In particular embodiments, the channel 150 is configured to retain holiday or decorative lights (e.g., Christmas lights). For instance, the electrical cord of a strand (or string) of holiday lights can be inserted into the channel 150 and thereafter retained by the clip 100. Other types of objects can also be retained as desired. In some embodiments, the object is retained within the channel 150 by gravitational forces. For example, when coupled to a structure such as a house, the channel 150 can be directed upwards (e.g., towards a soffit of a house) such that an object such as an electrical cord will not fall out. The shape and/or curvature of the third arm 140 (and/or the channel 150) can also aid in retaining the object within the channel 150.

Without limitation, it will be appreciated that many different types of materials can be used in manufacturing the clip 100. For example, in certain embodiments, the clip 100 comprises a plastic material. Other polymeric materials can also be used. In further embodiments, the material comprises an elastomeric material. The clip 100 can also be made in various ways, including with the use of molding techniques, injection molding techniques, and other techniques known in the art. The clip 100 can also comprise an integral structure in which the base 110 and arms 120, 130, 140 are formed as a single clip structure 100.

Multiple clips 100 can also be used in an attachment system. For example, in certain embodiments, a plurality of clips 100 are used to couple an elongated object at regular (or irregular) intervals. The order in which the clip 100 is coupled to an object or a structure can also be varied as desired. For example, in certain embodiments, one or more clips 100 are coupled to a structure, after which an object can be inserted into the channel 150 and retained therein. In other embodiments, one or more clips 100 are coupled to an object (e.g., via insertion into the channel 150), after which the clips 100 are coupled to a structure.

Methods of using the clips are also disclosed herein. In particular, it is contemplated that any of the components, principles, and/or embodiments discussed above may be utilized in either a clip or a method of using the same. For example, as previously discussed, in certain embodiments the clip is configured to be coupled to a structure. Various types of structures are contemplated. In certain embodiments, the clip is configured to be coupled to a house, such as from an overhang or eave of a house. In some of such embodiments, the clip is configured to be coupled to a portion of the fascia, such as a portion of the fascia that is adjacent to or abutting a soffit panel.

Figure 2:
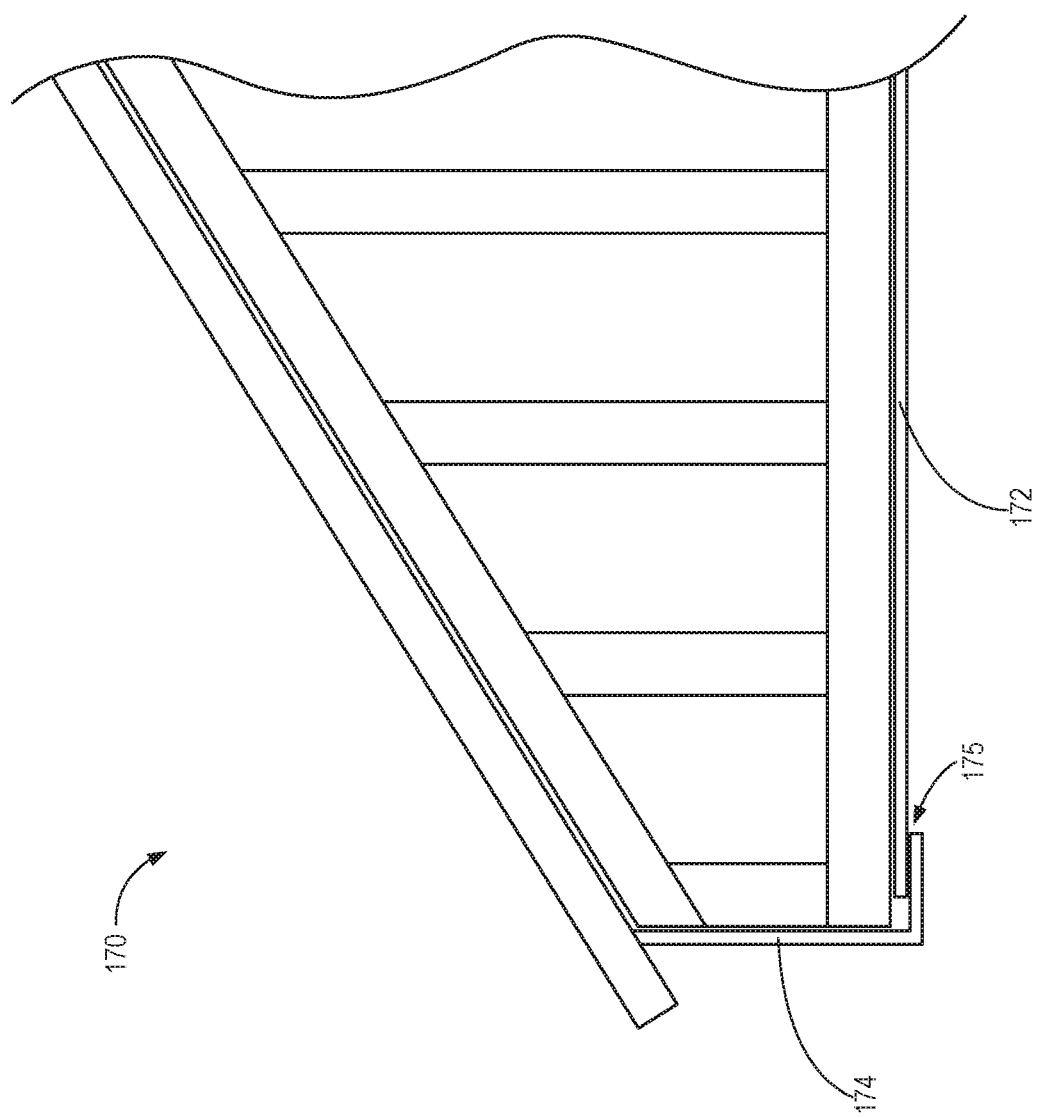
FIG. 2 is a cross-sectional view of a structure to which the clip can be coupled in accordance with another embodiment of the present disclosure.

An exemplary housing structure 170 comprising a soffit panel 172 and a fascia 174 is depicted in FIG. 2. As shown therein, a channel 175 exists between the soffit panel 172 and the fascia 174 into which the clip 100 can be inserted. When desired, a user can couple the clip 100 to the fascia 174, for example, by inserting a portion (e.g., first arm 120) of the clip 100 into the channel 175 between the soffit panel 172 and the fascia 174, as shown in FIG. 3.

Figure 3:
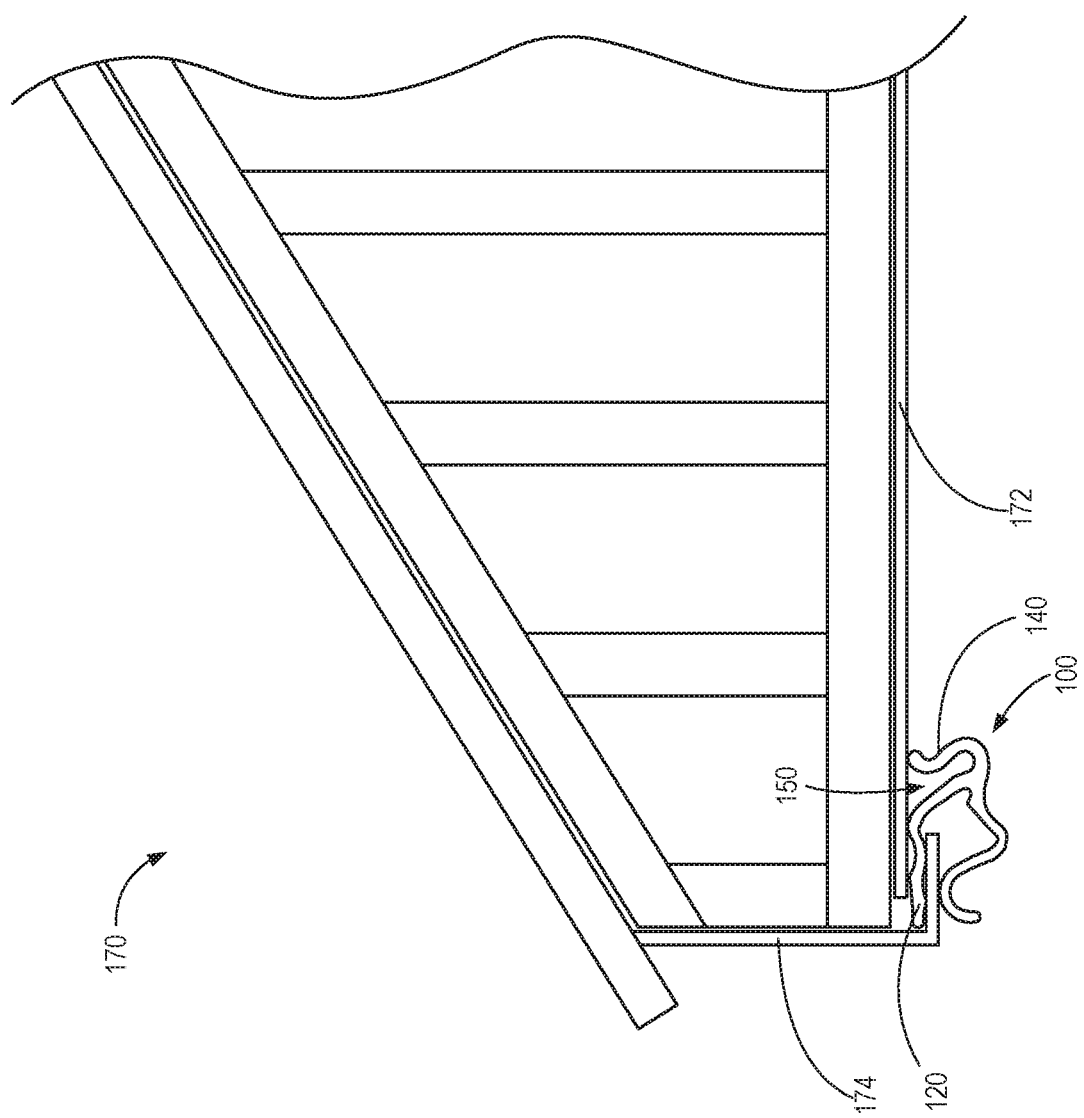
FIG. 3 is a cross-sectional view of a clip coupled to the structure of FIG. 2.

As further shown in FIG. 3, the retaining channel 150 is disposed in an upward orientation such that an object can be retained therein. The third arm 140 can also extend towards the soffit panel 172. In some embodiments, the third arm 140 can extend to and abut the soffit panel 172. In other embodiments, the third arm 140 extends only partially towards the soffit panel 172, such that a gap is left between the third arm 140 and the soffit panel 172. In some instances, the gap can be used for inserting an object into the channel 150 while the clip 100 is in an inserted position.

As can be appreciated, in the embodiment of FIG. 3 the clip 100 is sized to show how it can be inserted into a gap or channel between the fascia 174 and the soffit panel 172. It will be appreciated that the clip 100, the fascia 174, the soffit panel 172, and the structure 170 are not necessarily drawn to scale. For example, the clip 100 can be substantially smaller than the soffit panel 172 and the fascia 174. For example, in certain embodiments, the clip 100 is less than 5 inches, less than 4 inches, or less than 3 inches in length.

Figure 4:
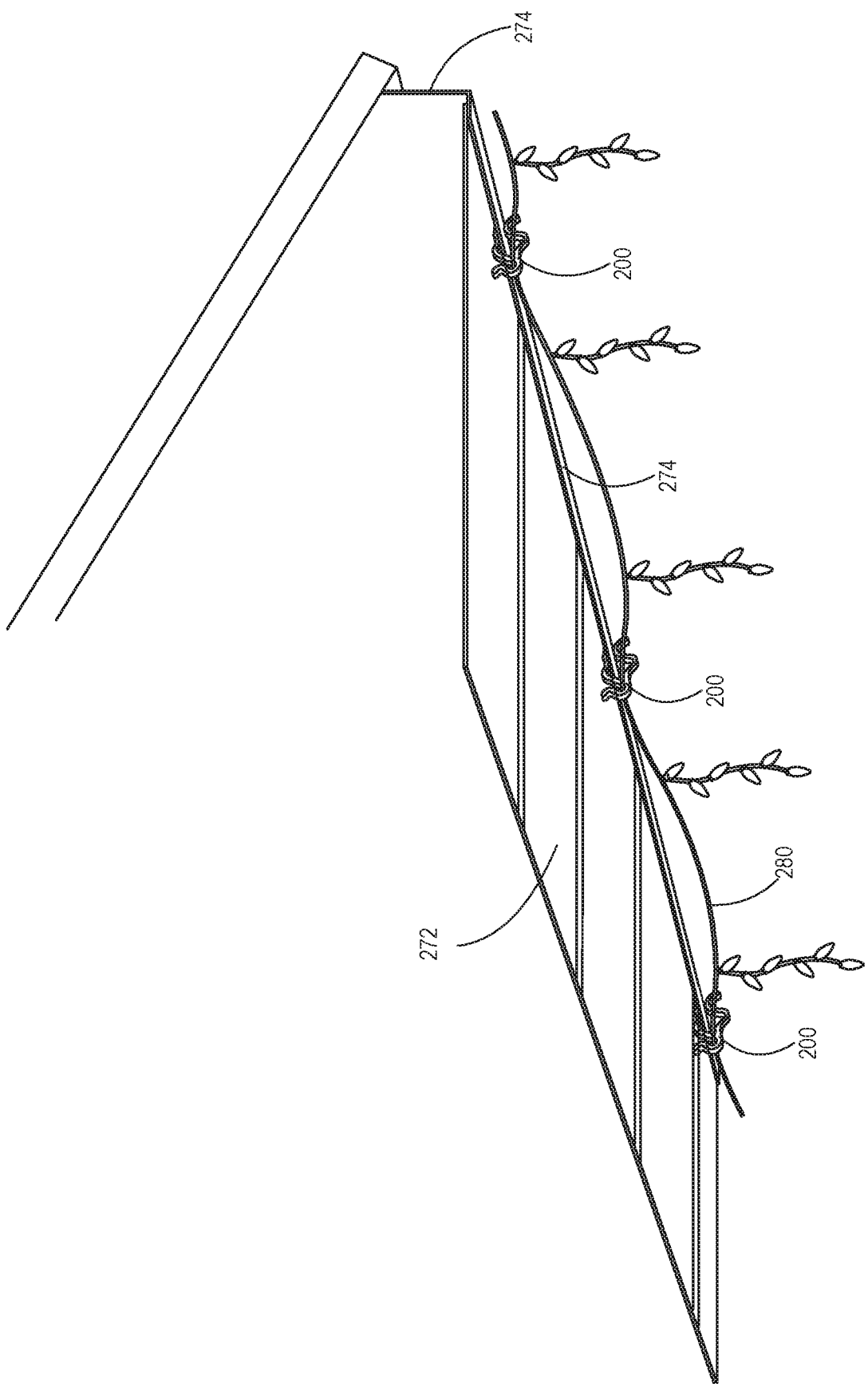
FIG. 4 is a perspective view of a structure to which a clip is coupled in accordance with another embodiment of the present disclosure.

FIG. 4 depicts a bottom view of a soffit panel 272 and fascia 274 in accordance with another embodiment of the present disclosure. As shown in FIG. 4, a plurality of clips 200 are coupled to the structure. In particular, a plurality of clips 200 are coupled to various portions of the fascia 274. An elongated object 280 is also shown being retained by the clips 200. Specifically, a string or strand of holiday lights comprising an electrical cord and one or more lights is shown being retained by the clips 200. As can be appreciated, any variety of holiday lights can be retained by the clips 200. For example, in certain embodiments icicle lights can be retained by the clips 200. In the illustrated embodiment, the electrical cord is also shown as sagging between adjacent clips 200. It will be appreciated that this configuration is shown for illustrative purposes and is not limiting in any way. For example, it will be appreciated that the electrical cord could be pulled tight, such that it extends in a substantially linear fashion between adjacent clips 200. Hanging the electrical cord substantially linearly can aid in hiding the electrical cord and/or minimizing visualization of the electrical cord by an observer.

In one embodiment, an illustrative method of employing the clip comprises a step of obtaining a clip as disclosed herein. The method can further comprise a step of inserting the first arm of the clip into a channel between a fascia and a soffit of the house. The method can further comprise a step of inserting an electrical cord into a retaining channel of the clip. In certain of such embodiments, the electrical cord is inserted into the retaining channel prior to inserting the first arm of the clip into the channel between the fascia and the soffit. Other method steps can also be employed.

References to approximations are made throughout this specification, such as by use of the terms "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially linear" is recited with respect to a feature, it is understood that in further embodiments, the feature can have a precisely linear configuration.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. The scope of the invention is therefore defined by the following claims and their equivalents.

What is claimed is:

1. A method of coupling holiday lights to a house, comprising:
   obtaining a clip comprising
      a base;
      a first arm comprising a first end and a second end;
      a second arm comprising a first end and a second end, the first and second arms defining a first channel; and
      a third arm comprising a first end and a second end, wherein the third arm is substantially S-shaped, the first and third arms defining a second channel, the second channel configured for receiving an electrical cord of a strand of holiday lights, wherein an opening of the second channel is disposed substantially orthogonal to an opening of the first channel;
      wherein the first arm and the second arm are configured to cooperate with one another to couple the clip to a house;
   inserting the first arm of the clip into a third channel between a fascia and a soffit of the house; and
   inserting the electrical cord into the second channel.

2. The method of claim 1, wherein the first end of the first arm is coupled to the base and the second end of the first arm comprises a beveled tip; and
   wherein the first end of the second arm is coupled to the base and the second end of the second arm extends away from the first arm.

3. The method of claim 1, wherein the electrical cord is inserted into the second channel prior to inserting the first arm of the clip into the third channel between the fascia and the soffit of the house.

4. The method of claim 1, wherein the clip comprises a first configuration, wherein in the first configuration a portion of the first arm is disposed proximate a portion of the second arm.

5. The method of claim 4, wherein the clip is biased towards the first configuration.

6. The method of claim 1, wherein the second channel is directed towards the soffit when the first arm of the clip is inserted into the third channel between the fascia and the soffit of the house.

7. A method of coupling an electrical cord to a building structure, comprising:
obtaining a clip comprising
a base;
a first arm comprising a first end and a second end;
a second arm comprising a first end and a second end, the first and second arms defining a first channel; and
a third arm comprising a first end and a second end, the first and third arms defining a second channel configured for receiving an electrical cord, wherein an opening of the second channel is disposed substantially orthogonal to an opening of the first channel;
wherein the first arm and the second arm are configured to cooperate with one another to couple the clip to a building structure;
inserting the first arm of the clip into a third channel between a fascia and a soffit of the building structure such that the second channel is directed towards the soffit of the building structure; and
inserting the electrical cord into the second channel.

8. The method of claim 7, wherein the first end of the first arm is coupled to the base and the second end of the first arm comprises a beveled tip; and
wherein the first end of the second arm is coupled to the base and the second end of the second arm extends away from the first arm.

9. The method of claim 7, wherein the electrical cord is inserted into the second channel prior to inserting the first arm of the clip into the third channel between the fascia and the soffit of the building structure.

10. The method of claim 7 wherein the third arm is substantially S-shaped.

11. The method of claim 7, wherein the clip comprises a first configuration, wherein in the first configuration a portion of the first arm is disposed proximate a portion of the second arm.

12. The method of claim 11, wherein the clip is biased towards the first configuration.

13. The method of claim 7, wherein the electrical cord comprises holiday lights or decorative lights.

14. A method of coupling an electrical cord to a building structure, comprising:
obtaining a clip comprising
a base;
a first arm comprising a first end and a second end;
a second arm comprising a first end and a second end, the first and second arms defining a first channel, wherein an opening of the first channel is disposed along a first direction;
a third arm comprising a first end and a second end, wherein the third arm is substantially S-shaped, the first and third arms defining a second channel configured for receiving an electrical cord, wherein an opening of the second channel is disposed along a second direction that is different than the first direction;
wherein the first arm and the second arm are configured to cooperate with one another to couple the clip to a building structure;
inserting the first arm of the clip into a third channel between a fascia and a soffit of the building structure such that the second channel is directed towards the soffit of the building structure; and
inserting the electrical cord into the second channel.

15. The method of claim 14, wherein the first end of the first arm is coupled to the base and the second end of the first arm comprises a beveled tip; and
wherein the first end of the second arm is coupled to the base and the second end of the second arm extends away from the first arm.

16. The method of claim 14, wherein the electrical cord is inserted into the second channel prior to inserting the first arm of the clip into the third channel between the fascia and the soffit of the building structure.

17. The method of claim 14, wherein the clip comprises a first configuration, wherein in the first configuration a portion of the first arm is disposed proximate a portion of the second arm.

18. The method of claim 14, wherein the electrical cord comprises holiday lights or decorative lights.

19. The method of claim 14, wherein the opening of the first channel is disposed substantially orthogonal to the opening of the second channel.

* * * * *